United States Patent

Fulkerson et al.

[15] 3,653,935
[45] Apr. 4, 1972

[54] STABILIZING CERTAIN NITROGEN-CONTAINING DERIVATIVES OF CELLULOSE

[72] Inventors: Brazelton Fulkerson; John W. Mench, both of Rochester, N.Y.

[73] Assignee: Eastman Kodak Company, Rochester, N.Y.

[22] Filed: June 4, 1969

[21] Appl. No.: 830,546

Related U.S. Application Data

[63] Continuation-in-part of Ser. No. 653,646, July 17, 1967, abandoned.

[52] U.S. Cl. ............................................................106/189
[51] Int. Cl. .......................................................C08b 27/42
[58] Field of Search ..................106/186, 189; 260/224, 225

[56] References Cited

UNITED STATES PATENTS

| | | | |
|---|---|---|---|
| 2,072,870 | 9/1937 | Dreyfus | 260/101 |
| 2,241,226 | 6/1941 | Malm et al. | 260/225 |
| 2,407,209 | 3/1946 | Swan | 106/182 |
| 2,899,315 | 11/1959 | Williams | 106/171 |
| 3,086,897 | 4/1963 | Sollott | 106/189 |

*Primary Examiner*—Theodore Morris
*Attorney*—Walter O. Hodsdon and John T. Lewis

[57] ABSTRACT

Certain nitrogen-containing derivatives of cellulose (products from the reaction of unsaturated cellulose esters or ethers with organic nitrogen-containing bases) spontaneously degrade when they are warmed slightly above room temperature to yield products that are insoluble in common organic solvents such as acetone, whereas the N-containing cellulosic materials, as originally prepared, exhibit high solubility in such solvents. It has been discovered that a small amount of phenolic type organic antioxidant inhibits such undesirable spontaneous degradation.

5 Claims, No Drawings

STABILIZING CERTAIN NITROGEN-CONTAINING DERIVATIVES OF CELLULOSE

This application is a continuation-in-part of U.S. application Ser. No. 653,646, filed July 17, 1967 now abandoned.

This invention relates to the stabilization of nitrogen-containing derivatives of cellulose that ordinarily spontaneously degrade when they are warmed slightly above room temperature to yield materials that are insoluble in common organic solvents.

For some presently unexplainable reason, the nitrogen-containing cellulosic products that are formed when organic nitrogen-containing bases are reacted with unsaturated cellulose esters or ethers degrade spontaneously when they are warmed to slightly elevated temperatures (i.e., above about 100° F). The result of such spontaneous degradation is the effective insolubilization of the material to most common organic solvents such as acetone, benzene, toluene, methylene chloride, and the like. Since the degraded products cannot be dissolved in most common organic solvents, their usefulness is strictly limited. In addition, the sensitivity of these materials to slightly elevated temperatures places a very stringent limitation upon manufactures of such materials, because process temperatures must ordinarily be maintained at very low levels (especially when water or other solvents must be removed from the materials in a typical final drying step).

The solution to the "spontaneous degradation" problem described above is particularly difficult in view of the fact that, by ordinary chemical analysis, no explainable differences can be detected (other than the insolubilization effect itself) between the degraded product and carefully prepared, undegraded material. For example, no change in the degree of substitution of the cellulose, no change in the amounts of ether or ester substituents on the cellulose molecule, and no change in the amount of oxygen, carbon, and hydrogen (via elemental analysis) can be detected. To confuse this situation still further, elemental analysis for nitrogen revealed an apparent increase in nitrogen content of the materials that were degraded. Since the reaction of organic base with the unsaturated cellulosic material is believed to proceed via the formation of an N-C bond:

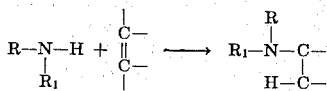

the spontaneous degradation of the reaction products cannot logically be explained at this time.

Thus, it can be appreciated that it was surprising to discover that these unstable nitrogen-containing cellulosic materials can be stabilized by intermixing with them an effective stabilizing amount of an organic antioxidant of the phenolic type.

Organic antioxidants of the phenolic type (which contain at least one OH group attached to an aromatic 6-carbon ring) are well known in the polymer art because they have been found effective in stabilizing many types of polymeric material against reaction with oxygen in the air to prevent, for example, excessive weathering, embrittlement, and/or loss of strength, and the like. Typical examples of phenolic type organic antioxidants that can be used successfully in the practice of this invention include butylated hydroxytoluene, p-methoxyphenol, p-tertiary-butylphenol, t-butyl hydroquinone, t-butyl catechol, hydroquinone, thymol, 2,5-bis(1,1-dimethylpropyl) hydroquinone and mixtures thereof. Of these, particularly preferred materials are butylated hydroxytoluene and p-methoxy phenol. Although the actual amount of phenolic antioxidant that is found necessary to effectively stabilize a particular N-containing cellulosic derivative will vary somewhat, depending upon such factors as the degree of stabilization desired, the particular antioxidant (or antioxidant mixture) that is utilized, and even the particular N-containing cellulosic derivative to be stabilized thereby, generally from about 0.05 to about 5 weight percent or more (and preferably from about 0.2 and about 2 weight percent), based on the weight of the N-containing cellulosic material being stabilized can be used.

The nitrogen-containing cellulosic derivatives that can be stabilized in accordance with this invention are the products of the reaction of organic nitrogen-containing bases (wherein there is at least one replaceable hydrogen connected directly to a nitrogen atom; thus,

with unsaturated cellulose derivatives such as the well-known unsaturated cellulose ethers, unsaturated cellulose esters and unsaturated mixed ethers and esters of cellulose. These materials can be made in accordance with the processes set out in U.S. Pat. No. 2,072,870 (the disclosure of which is incorporated by reference herein) and detailed in Example 1, below. Thus, useful unsaturated cellulosic materials may be unsaturated esters, ethers, or even mixed ether-esters of cellulose. For example, the esters may be aliphatic (substituted or unsubstituted, and if substituted, are preferably hydroxy or carboxylic acid substituted, such as cellulose crotonate, cellulose maleate, cellulose oleate, cellulose cinnamate, cellulose tiglate, cellulose linoleate, or cellulose ricinoleate). Unsaturated mononuclear aryl and aralkyl esters of cellulose such as cellulose cinnamate and cellulose phthalate. The useful unsaturated cellulose ethers can be the simply unsaturated aliphatic ethers such as allyl cellulose, vinyl cellulose, or crotonyl cellulose or of the cyclic series, as for example styryl cellulose. Not all the substituent groups on the cellulose molecule need be unsaturated. Thus, in addition to the unsaturated ester and/or ether substituents or groups, the useful cellulose molecules can contain saturated ester and ether groups, as for example acetyl, formyl, propionyl, butyryl, isobutyryl, benzoyl, methyl, ethyl, propyl, benzyl; hydroxyalkyl groups such as hydroxymethyl, hydroxyethyl, or hydroxypropyl; and mixtures of any of these. One or two unsaturated ester or ether groups may be present in the cellulose molecules that are reacted with the organic bases as described above. Similarly unsaturated mixed ether-esters can be employed, the whole or part of either the ester or ether groups (or both) being unsaturated.

The organic bases with which the unsaturated cellulose derivatives are reacted in accordance with these procedures can be aliphatic, alkyl, aromatic, or alicyclic, and preferably should contain from 1 to about 20 carbon atoms. They must contain at least one hydrogen atom connected directly to a nitrogen atom, and are preferably either primary or secondary organic amines. Typical, non-limiting examples of useful organic bases are methylamine, ethylamine, propylamine, amylamine, hexylamine, dimethylamine, diethylamine, ethanolamine, diethanolamine, 2,2-dichloroethylamine, aniline, toluidine, xylidine, cyclohexylamine, benzylamine, methyl benzylamine, piperidine, urea, guanidine, morpholine, and the like.

The antioxidants can be blended with the N-containing cellulose derivatives in any of a number of ways in the successful practice of the present invention. The only care necessary being that the antioxidant (or mixture of antioxidants) be blended fairly uniformly through the cellulosic material being stabilized. Thus, the antioxidant can be simply blended through solidified N-containing material in a conventional blender, for example. Or it can be added directly to the mixture of reactants during or after the formation of the N-containing cellulosic material. Still another method for obtaining an effective, stabilized blend of antioxidant plus N-containing cellulosic material is to first dissolve the antioxidant in a suitable solvent, blend the resulting solution with the material to be stabilized, and then evaporate or otherwise remove the solvent from the resulting blend.

In the following example, all parts are by weight unless otherwise specified.

EXAMPLE 1

A mixture of 100 parts of cellulose propionate crotonate (containing 28 percent propionyl and 25 percent crotonyl), 250 parts of morpholine and 10 parts of glacial acetic acid (catalyst) is heated in conventional glass lined reactor for 5 hours at 85° C. The resulting reaction mixture is then cooled to 35° C and blended with 900 parts of acetone. The resulting blend is then poured slowly into 15,000 parts of distilled water (to precipitate the N-containing cellulosic product, cellulose propionate morpholinobutyrate). The precipitate is recovered by conventional filtration procedures, and washed 7 times with 1,000 parts each of water.

Onto the resulting wet filter cake are poured a solution of 1 part of p-methoxyphenol dissolved in 359 parts of distilled water. The resulting mixture is tumbled in a closed container at room temperature for 16 hours and then dried for 16 hours at 140° F in a conventional forced draft drying oven. Table I, below illustrates the effective stabilization that can be accomplished via the practice of this invention. Samples of cellulose propionate crotonate made according to the procedure of Example 1, above, were used to obtain the data shown in Table I. The length of time at which the N-containing cellulosic material remains stable (as illustrated by its retention of its high solubility in acetone) indicates the relative stability of the material. The number of "Hours" in Table I indicates the length of time the sample retained its high solubility in acetone, while the sample was held continuously at a temperature of 140° F in a conventional forced draft drying oven.

Stabilization by use of butylated hydroxytoluene can best be accomplished by blending the antioxidant into the reaction mixture just prior to the precipitation of the N-containing cellulosic reaction product.

TABLE I

| Sample No. | Stabilizer | Amount of Stabilizer (%) | Hours |
|---|---|---|---|
| 1 | None (control) | 0.0 | < 8 |
| 2 | p-methoxyphenol | 0.2 | 23 |
| 3 | p-methoxyphenol | 0.5 | 40 |
| 4 | p-methoxyphenol | 1.0 | 75 |
| 5 | butylated hydroxytoluene | 0.2 | 80 |
| 6 | butylated hydroxytoluene | 0.5 | 100 |
| 7 | butylated hydroxytoluene | 1.0 | > 100 |

What is claimed is:

1. Nitrogen-containing cellulose derivative composition wherein the nitrogen-containing derivative has been stabilized against spontaneous insolubilization in common organic solvents by being blended with an effective stabilizing amount of a phenolic type organic antioxidant; said nitrogen-containing cellulose derivative being the product of the reaction of (a) an unsaturated derivative of cellulose selected from the group consisting of unsaturated cellulose ethers, unsaturated cellulose esters and unsaturated mixed ethers and esters of cellulose with (b) an organic amine selected from the group consisting of primary and secondary amines that contain from 1 to 20 carbon atoms.

2. A stabilized, nitrogen-containing cellulose derivative composition as in claim 1, wherein the amount of said phenolic type antioxidant in said composition is between about 0.05 and about 5 weight percent, based on the weight of said nitrogen-containing derivative in said composition.

3. A stabilized, nitrogen-containing cellulose derivative composition as in claim 2, wherein said phenolic type antioxidant is selected from the group consisting of butylated hydroxytoluene, p-methoxy-phenol, p-tertiary-butylphenol, t-butyl pryoatechol, t-butyl hydroquinone, hydroquinone, thymol, 2,5-bis(1,1-dimethylpropyl) hydroquinone and mixtures thereof.

4. A stabilized, nitrogen-containing cellulose derivative composition as in claim 2, wherein said nitrogen-containing cellulose derivative is a product of the reaction of (a) an unsaturated ester of cellulose selected from the group consisting of cellulose crotonates, cellulose maleate, cellulose phthalate, cellulose oleate, cellulose cinnamate, and cellulose tiglate with (b) an organic amine selected from the group consisting of primary and secondary amines that contain from 1 to 20 carbon atoms.

5. A composition comprising cellulose propionate morpholinobutyrate and a stabilizer selected from the group consisting of butylated hydroxytoluene and p-methoxyphenol; the weight ratio of said stabilizer to said cellulose proprionate morpholinobutyrate in said composition being between about 1 to 500 and about 1 to 50.

* * * * *